Feb. 19, 1935.    P. K. SAUNDERS    1,992,043
DIAPHRAGM VALVE
Filed June 24, 1932    2 Sheets-Sheet 1

INVENTOR.
Philip K. Saunders,
BY
A. Miller Belfield
ATTORNEY.

Feb. 19, 1935.   P. K. SAUNDERS   1,992,043
DIAPHRAGM VALVE
Filed June 24, 1932    2 Sheets-Sheet 2
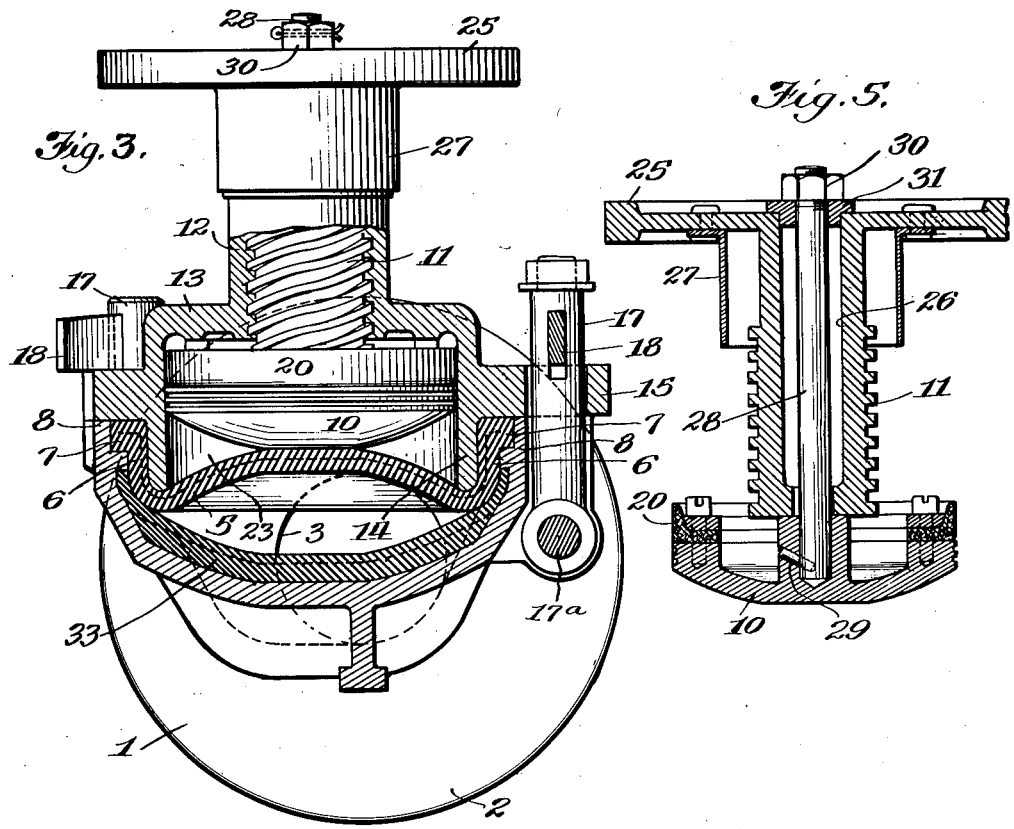
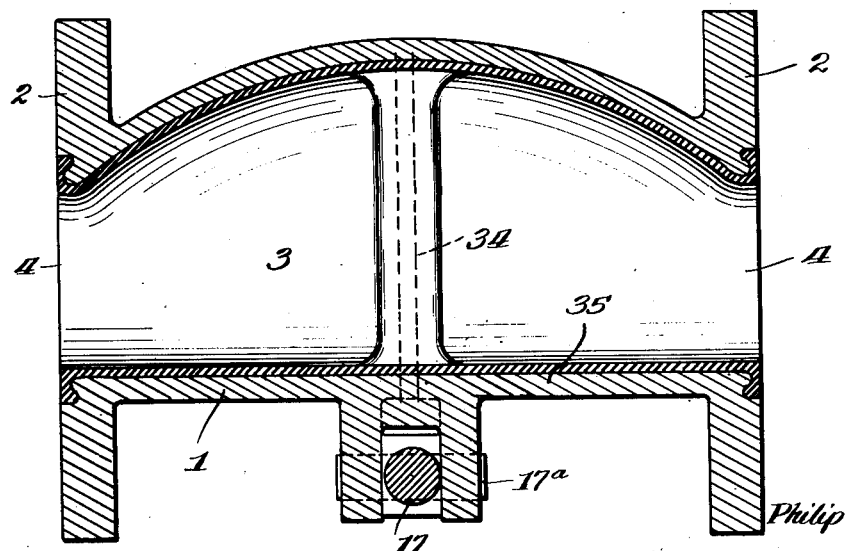
INVENTOR.
Philip K. Saunders
BY
A. Miller Belfield
ATTORNEY.

Patented Feb. 19, 1935

1,992,043

UNITED STATES PATENT OFFICE 1,992,043

DIAPHRAGM VALVE

Philip Keith Saunders, Montreal, Quebec, Canada

Application June 24, 1932, Serial No. 619,021

15 Claims. (Cl. 251—24)

My invention relates to valves and like devices and particularly to diaphragm valves of the "stream-line" type,—by which is meant a valve with a substantially straight-through passage or bore into which is projected a diaphragm or other closing device to open and close the valve.

One of the objects of the invention is to provide a simple and advantageous construction of valve of the kind indicated.

Another object of the invention is to provide a nearly straight passage or bore through the valve.

Another object of the invention is to arrange for the advantageous operation of the valve by extraneous means more or less independent of the liquid or fluid flowing through the valve, as for example by the operation of a vacuum.

Another obect of the invention is to arrange for the simple and direct actuation of the diaphragm or valve member by an actuating member such as for example a piston, and to provide a simple and expeditious structure for permitting this actuation.

Another object of the invention is to permit effective drainage of the valve.

Another object of the invention is to prevent access of oil to the valve member, such as the diaphragm.

Another object of the invention is to prevent the valve from being shaken loose or open by vibration and the like.

Another object of the invention is to prevent much bending of the valve closure parts.

Another object of the invention is to prevent leakage in the valve or any of its parts.

Other objects of the invention will appear and be pointed out hereinafter.

Figure 1:
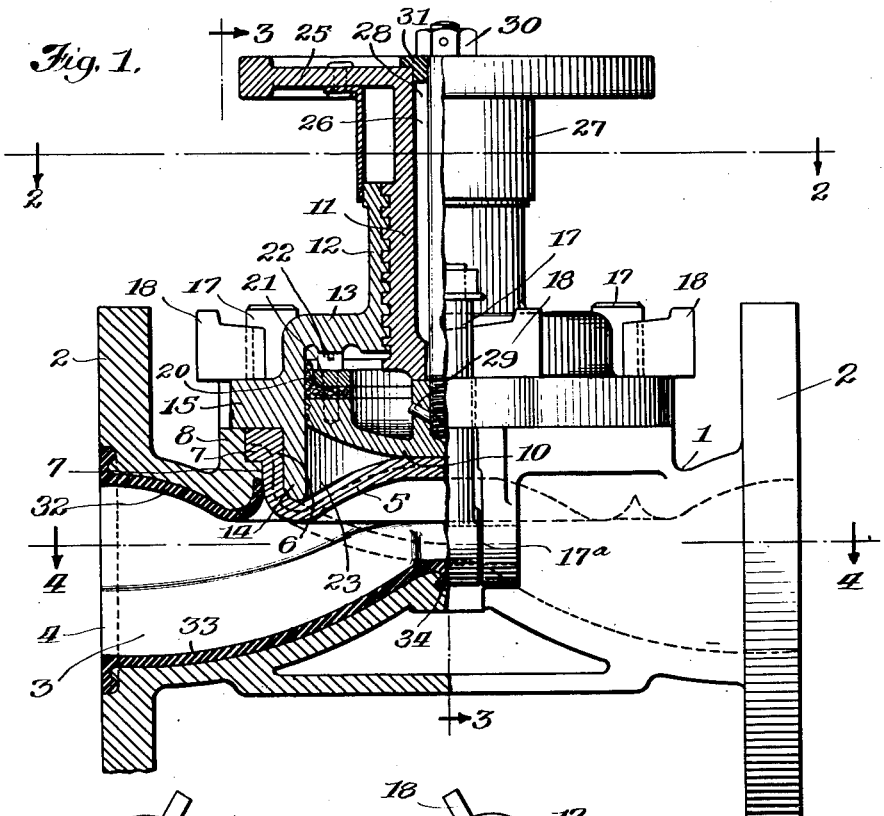
Fig. 1 is a side elevational view of a valve embodying my present invention, with a portion of the outer casing broken away for convenience of illustration.
Figure 2:
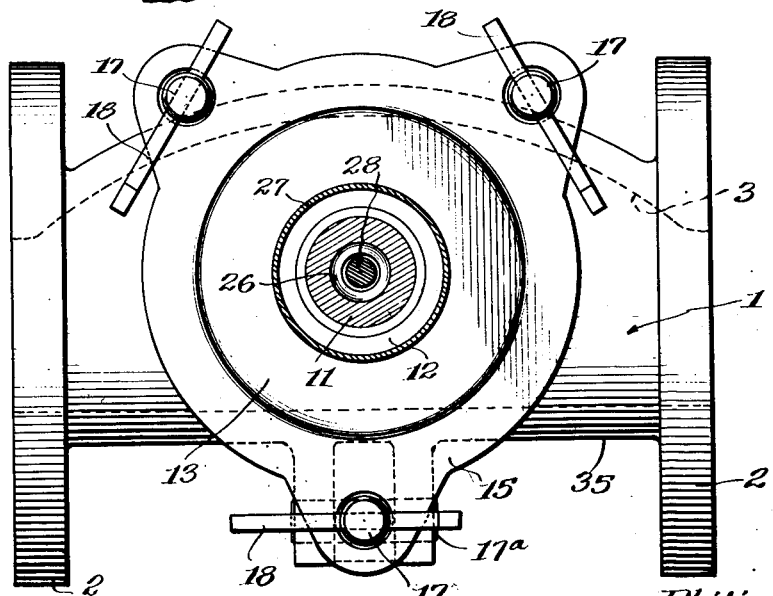
Fig. 2 is a horizontal sectional view of the valve shown in Fig. 1 taken on the line 2—2 of Fig. 1.

Figs. 3 and 4 are sections taken on the lines 3—3 and 4—4 respectively in Fig. 1; and Fig. 5 is a vertical view of the diaphragm actuating mechanism.

Referring to the drawings, I show in Fig. 1 a valve comprising a casing 1, having end flanges 2 and a longitudinal extending bore or passage 3 whose ends 4 terminate at the opposite ends of the casing 1.

This bore or passage 3 is a substantially straight-through bore or passage producing with a diaphragm valve a stream-line valve, and is very nearly straight in order that the flow of liquid or fluid passing through the valve may be effected or deflected as little as possible, and so interfered with and hindered in its passage through the valve as little as possible.

A diaphragm 5 is shown arranged preferably about midway between the ends of the bore or passage 3, and constructed and adapted to be moved into position to open said bore or passage 3, as shown in full lines in Fig. 1, and also so as to close said bore or passage and thereby close the valve, as shown in dotted lines in said Fig. 1. Accordingly this diaphragm 5 is made flexible so that it may be moved into opening or closing position.

This diaphragm 5 is preferably arranged so that in its operative or open position its movable or operating portion is substantially in alignment with adjacent portions of the wall of the bore or passage 3, and to prevent projection of fastening members into the bore or passage, the diaphragm edge is bent laterally as at 6, and this upturned edge 7 is held in position, as for example by clamping it between portions 8 of the valve casing and other clamping members. In this way the diaphragm 5 has its edge and the clamping members therefor at one side of the bore or passage and well out of the way of liquid or fluid passing in the same, so as to present no obstacle to the flow of the liquid or fluid.

The diaphragm 5 may be actuated by a piston 10, which is in turn actuated by a rotary and reciprocating stem 11 so as to move the piston up and down and thereby actuate the diaphragm 5.

The stem 11 is preferably arranged within a tubular extension 12 on a cap or bonnet 13, the tubular member 12 and stem 11 being preferably screw-threaded so that rotation of the latter will cause its movement in a direction lengthwise of the extension 12.

The bonnet or cap 13 has a casing-like portion or body 14 which fits within the annular or collar-like portion 8 of the casing 1 and serves as a member to co-operate with said portion 8 in order to clamp the edge 7 of the diaphragm 5 in position.

The body 14 of bonnet 13 also preferably has an annular flange 15 which extends across the annular end of diaphragm 5 and so covers and protects the upturned edge 7 of said diaphragm, and with ring-like portion 8 completely houses the same.

The cap or bonnet 13 is held in position by posts 17 pivoted at 17a and wedge members 18 passing through the same, the wedges 18 resting upon and pressing down against the flange-like member 15 on said bonnet or cap 13.

The threaded stem 11 preferably is in contact with and acts directly upon the piston head 10 so that there is direct action of the piston head upon the diaphragm, lending simplicity and efficiency in operation and construction.

The piston head 10 preferably fits closely within the chamber formed by the casing 14 and means are preferably provided for making a tight fit between the piston head and said casing, as for example providing the piston with a cup packing 20 which is held in place by a packing ring 21 and screws 22. This cup packing 20 is preferably arranged so that it will serve as a one-way or non-return sealing means, permitting air to pass by it and the piston 10 when the piston is moved in, but preventing air from passing when the piston is moved out.

In this way the piston will serve to create a vacuum in chamber 23 formed within the casing 14, when the piston is moved outwardly, and this vacuum will act to move or pull the diaphragm 5 outwardly when the piston is moved in that direction, and this action will of course be independent of the effect of the liquid or fluid passing through the bore 3 of the valve. In this way a very effective vacuum action to open the valve is secured, thereby facilitating valve opening and adding to efficiency.

The threaded piston stem 11 is preferably provided with a hand wheel 25 or other device for permitting said stem to be turned in order to control the operation of the diaphragm 5, and said stem 11 is preferably made of large size so that it and the tubular member 12 containing its lower portion, may not be bent or broken by being struck or roughly handled. This large size or diameter of the stem 11 permits the threads thereon to be of a small or slight pitch and thus prevents vibration or other shaking action from undesirably turning said stem 11 and thereby permitting or causing the valve to open. Said stem 11 is preferably made hollow, having a bore 26, so as to reduce weight.

A shell or casing member 27 is preferably secured to the under side of hand wheel 25 and arranged to extend down to and fit flush upon the upper end of tubular member 12 and a bolt 28 is preferably arranged within the hollow interior 26 of stem 11 and provided with a pin 29 at its lower end to make connection with the piston head 10 and with a nut 30 at its upper end, acting upon a washer 31 which closes bore 26 and holds pin 28 in place.

The bore passage 3 is preferably lined with suitable material 32, and the material 33 is preferably provided with a projection or plug 34 to fit in a corresponding cavity or socket in the casing 1 to hold said material 33 from gritting and crumpling.

One side of the valve is made straight, as shown at 35, so that the valve may be completely drained, when mounted on its side, with the flat side lowermost.

It will be seen that the valve may be readily assembled and disassembled and has many advantages in both construction and operation.

It will be understood that changes and modifications may be made without departing from the spirit of the invention.

What I claim is:

1. A stream line diaphragm valve device having a diaphragm valve whose edge portion is turned or bent laterally and clamped in such position, said valve device also having a bore or passage whose wall portion adjacent said diaphragm valve extends laterally of the fluid flow bore or passage so that the diaphragm ends may be fitted against said lateral portion and clamped in position, said diaphragm when in open position forming with said fluid flow bore a stream line passage.

2. A stream line diaphragm valve device having a diaphragm valve whose edge portion is bent laterally, and means for clamping said edge portion in a laterally bent condition, said valve device also having a portion of its wall extending laterally from the fluid flow portion of the bore or passage adjacent the diaphragm edge so as to permit said diaphragm edge to be fitted into position against said laterally extending wall portion, said diaphragm when in open position forming with said bore a streamline passage.

3. A valve of the class specified comprising a casing and having a diaphragm valve with a laterally extending edge portion and also having a cap or bonnet provided with a rim portion arranged to fit within said laterally extending edge portion of the diaphragm, and means for clamping the diaphragm valve and cap or bonnet to the casing in this relative arrangement, said means comprising pivoted posts passing through a flange on the cap or bonnet and wedge members passing through said posts.

4. A valve of the class specified having a diaphragm valve and a piston in contact therewith, said piston having a cylindrical portion provided with a convex end and being arranged in a chamber of the valve casing within which the piston fits closely, said convex end of the piston acting on the diaphragm and said cylindrical portion being also provided with a one-way or non-return packing arrangement and so constructed to permit formation of a vacuum between the piston and diaphragm when the piston is moved outwardly but to prevent formation of a vacuum on the outer side of the piston when the piston is moved inwardly.

5. A valve of the class specified having a body portion and a cap or bonnet fitted removably to the body portion, said cap or bonnet having a hollow portion forming a chamber adjacent the body portion of the valve, a diaphragm extending across the open end or mouth of said chamber and arranged to serve as the opening and closing member of the valve, a piston located in said chamber and in contact with said diaphragm, said piston having a close fit with the walls of said chamber and so constructed as to produce a suction or vacuum condition between the piston and diaphragm when the piston is moved outwardly and comprising a cylindrical portion the end of which nearest the diaphragm is provided with a convex surface for acting on the diaphragm.

6. A valve of the class specified having a body portion and a cap or bonnet fitted removably to the body portion, said cap or bonnet having a hollow portion forming a chamber adjacent the body portion of the valve, a diaphragm extending across the open end or mouth of said chamber and arranged to serve as the opening and closing member of the valve, a piston located in said chamber and in contact with said diaphragm, said piston having a close fit with the walls of said chamber and so constructed as to produce a suction or vacuum condition between the piston and diaphragm when the piston is moved outwardly, the edge portion of the diaphragm being bent or turned laterally on the outer side of the edge or rim portion of the hollow portion of the cap or bonnet so that the rim portion of the diaphragm fits between the rim portion of the cap or bonnet and the adjacent portion of the valve structure, and means for holding the cap or bonnet in position and clamping the rim portion of the diaphragm between the cap or bonnet and the body portion of the valve structure.

7. A device of the class specified having a valve body portion and a cap or bonnet removably fitted to the body portion, said cap or bonnet containing a piston comprising a cylindrical portion having a convex end and a diaphragm valve extending across the open end of the chamber in the cap or bonnet containing the piston, said piston having the convex end of its cylindrical portion acting upon diaphragm and provided with a cup packing and clamping means for holding said packing in position, said packing being adapted to permit movement of the piston inwardly without creating a vacuum and also adapted to cause a vacuum or suction condition between the piston and diaphragm when the piston is moved outwardly.

8. A device of the class specified having a bore or passage and having said bore or passage provided with lining material, said lining material and the wall of the bore or passage with which it contacts being provided with a cooperating plug and socket arrangement to hold the lining material in place.

9. A device of the class specified having a casing providing a fluid bore or passage and having a diaphragm for opening and closing said passage, said casing having a chamber containing a piston acting upon the diaphragm, said piston having a threaded stem and said casing having a threaded bore to cooperate with said stem, said stem being made hollow and containing a bolt extending down through the bore of the stem and having its lower end secured to the piston and its upper end secured to the stem.

10. A device of the class specified having a casing providing a fluid bore or passage and having a diaphragm for opening and closing said passage, said casing having a chamber containing a piston acting upon the diaphragm, said piston having a threaded stem and said casing having a threaded bore to cooperate with said stem, said stem being made hollow and containing a bolt extending down through the bore of the stem and having its lower end secured to the piston and its upper end secured to the stem, said stem being provided with an actuating wheel.

11. A device of the class specified having a casing providing a fluid bore or passage and having a diaphragm for opening and closing said passage, said casing having a chamber containing a piston acting upon the diaphragm, said piston having a threaded stem and said casing having a threaded bore to cooperate with said stem, said stem being made hollow and containing a bolt extending down through the bore of the stem and having its lower end secured to the piston and its upper end secured to the stem, said stem being provided with an actuating wheel, and a shield secured to the under side of the wheel and covering the upper end of the portion of the casing which provides the threaded socket for the threaded piston stem.

12. A device of the class specified having a casing composed of body and cap members whereof the body member has a fluid bore or passage and whereof the cap member rests upon and is secured to the body member and is provided with a piston chamber containing a piston, a diaphragm having its edge portion clamped between the body and cap members and arranged in position to be acted upon by said piston, said piston being provided with a threaded stem and the cap member being provided with a threaded socket to receive said stem, the upper end of said stem being provided with a rotary hand wheel for turning the stem, said stem having a longitudinal bore containing a bolt whose lower end is threaded and is screwed into a threaded socket in the piston and whose upper end is also threaded and provided with a nut acting upon a washer which engages the upper end of the stem, and an annular shield secured to the under side of the hand wheel and extending down to and covering the upper end of the portion of the cap member which is provided with the threaded socket for the piston stem.

13. A device of the class specified having a casing composed of body and cap members whereof the body member has a fluid bore or passage and whereof the cap member rests upon and is secured to the body member and is provided with a piston chamber containing a piston, a diaphragm having its edge portion clamped between the body and cap members and arranged in position to be acted upon by said piston, said piston being provided with a threaded stem and the cap member being provided with a threaded socket to receive said stem, the upper end of said stem being provided with a rotary hand wheel for turning the stem, said stem having a longitudinal bore containing a bolt whose lower end is threaded and is screwed into a threaded socket in the piston and whose upper end is also threaded and provided with a nut acting upon a washer which engages the upper end of the stem, and an annular shield secured to the under side of the hand wheel and extending down to and covering the upper end of the portion of the cap member which is provided with the threaded socket for the piston stem, the cap member being detachably secured to the base member and held in position by posts and wedges passed through apertures in said posts.

14. A device of the class specified having a body and a bonnet, the body having a longitudinally extending fluid bore or passage and a weir extending partway across the depth of said bore or passage and also having an opening opposite the weir and a diaphragm cooperating with the weir to open and close said bore or passage, the lower end of the bonnet being set within said opening and the body having a laterally extending wall surrounding said opening so that a laterally extending space is formed between the bonnet end and body wall and the outer edge of the diaphragm being positioned in this space so that said outer edge extends laterally from said bore or passage.

15. A device of the class specified having a body and a bonnet, the body having a longitudinally extending fluid bore or passage and a weir extending partway across the depth of said bore or passage and also having an opening opposite the weir and a diaphragm cooperating with the weir to open and close said bore or passage, the lower end of the bonnet being set within said opening and the body having a laterally extending wall surrounding said opening so that a laterally extending space is formed between the bonnet end and body wall and the outer edge of the diaphragm being positioned in this space so that said outer edge extends laterally from said bore or passage, and means for clamping the bonnet in position upon the body, said diaphragm having a laterally projecting portion at its outermost edge and the body having a channel to receive said projecting portion so that the clamping of the bonnet compresses said projecting portion and serves to hold the diaphragm firmly in position.

PHILIP KEITH SAUNDERS.